SELF-ACTUATING RECORD HOLDING APPARATUS

Filed Oct. 28, 1966

INVENTOR.
JULIAN GUTIERREZ
Reif and Gregory
ATTORNEYS

May 27, 1969 J. GUTIERREZ 3,446,360
SELF-ACTUATING RECORD HOLDING APPARATUS
Filed Oct. 28, 1966

INVENTOR.
JULIAN GUTIERREZ
BY
[signature]
ATTORNEYS

INVENTOR
JULIAN GUTIERREZ
BY
Reifsnider Gregory
ATTORNEYS

United States Patent Office 3,446,360
Patented May 27, 1969

3,446,360
SELF-ACTUATING RECORD HOLDING APPARATUS

Julian Gutierrez, 6233 Brookview Ave. S., Minneapolis, Minn. 55424

Filed Oct. 28, 1966, Ser. No. 590,252
Int. Cl. G11b *1/00;* A47b *81/06*
U.S. Cl. 211—40 1 Claim

ABSTRACT OF THE DISCLOSURE

A phonograph record rack consisting of a frame, a plurality of spaced parallel axially pivoted record holding members, each comprising a yoke portion to receive a record and having a depending leg portion of such length and arrangement as to engage an adjacent like leg portion for a sufficient interval to tilt the record holding member of said leg portion to a point beyond its center of gravity whereby said tilted record holding member in like manner automatically engages and tilts the record holding member adjacent thereto.

The invention herein relates to improvement in a rack type of apparatus for holding and displaying relatively flat items of various kinds. In the specific embodiment of the invention here disclosed, particular reference is had to phonograph records, such as are generally contained in a paperboard jacket.

Generally stated, the invention herein comprises a frame member having a plurality of parallel cross members pivoted therein with each being arranged to hold a phonograph record upright and each having a doubling leg portion of such length and arrangement that when the first of said holding members has been tilted beyond its point of center of gravity that its leg portion will engage and tilt the adjacent holding member in like manner and thus each holding member automatically tilts the holding member adjacent thereto with the exception that if a record has been removed from a holding member that such holding member will be incapable of tilting the holding member adjacent thereto holding a record therein.

It is desirable to have such an apparatus as is here disclosed, arranged and constructed to hold records in such a manner that in viewing said records, the manual action of tilting one record causes the adjacent and successively positioned records to automatically tilt in like manner. The structure described resulting in the automatic tilting of said records comprises the improvement in the apparatus herein.

It is an object of this invention therefore to provide a record holding apparatus particularly constructed and arranged for the automatic tilting of said records for a review or inspection thereof.

It is another object of the invention herein to provide simply constructed record holding members tiltable in such a manner that when one of said holding members has swung through a predetermined distance, it engages and causes the adjacent holding member to tilt and in like manner causes an automatic progression of this action.

It is also an object of this invention to provide a record holding apparatus so arranged and constructed that records held therein may be caused to tilt automatically for inspection to the point at which a record has been previously removed and at such point said tilting action comes to a stop.

These and other objects and advantages of the invention will be set forth in the following description made in connection with the accompanying drawings in which like reference characters refer to similar parts throughout the several views and in which.

Figures 1, 2:
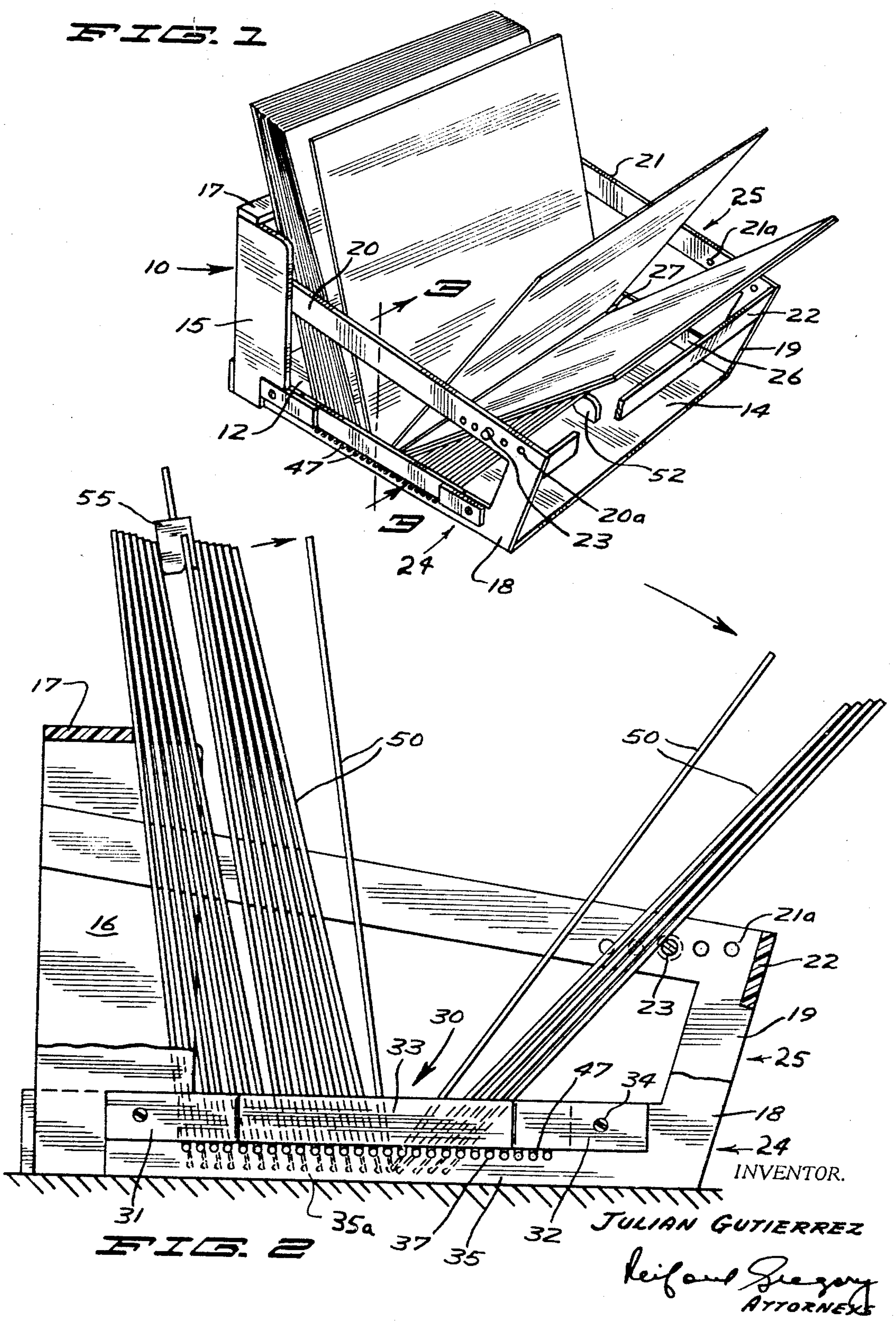
FIG. 1 is a view in perspective of the apparatus herein.
FIG. 2 is a view on an enlarged scale partially in side elevation and partially in longitudinal vertical section with portions thereof being shown in dotted line.

Referring to the drawings, the record holding apparatus comprising the subject matter of the invention herein is indicated generally by the character 10. It will be understood that the apparatus shown may take various specific forms all within the scope of the invention herein. The specific embodiment shown is particularly adapted to receive and hold the flat members 50 indicated which are taken here to represent paperboard jackets containing phonograph records and are hereinafter referred to as records.

Said apparatus 10 has a bottom wall 14 formed of a rectangular plate member. Upstanding therefrom are rear side wall portions 15 and 16 having an overlying connecting strip member 17.

Integral frame members 24 and 25 form side walls comprising upstanding somewhat inclined forward side wall portions 18 and 19 of somewhat lesser height than said rear wall portions, and the upper portions of the same are connected by an upper cross strip member 22. Respectively connecting the upper portions of said front and rear side wall portions are strip portions 20 and 21.

Connecting the base portions of said side portions 16 and 19 is a strip or narrow wall portion 26. Connecting the base portions of the side portions 15 and 18 is a narrow wall or strip portion 35 having a major central portion 35*a* thereof reduced in height and having a multiplicity of transverse open topped slots or apertures 37 formed therein and spaced therealong. Apertures 27 corresponding to and respectively in transverse alignment with said slots 37 are formed in said wall portion 26.

A sectional plate member 30 comprises a central strip portion 33 overlying the upper edge of said slotted area of said wall portion 35, and end portions 31 and 32 secured by screws 34 respectively overlap the adjacent outer surface end portions of said wall portion 35 and the plate member 33.

The forward end portions of said side wall portions 20 and 21 respectively have pairs of aligned apertures 20*a* and 21*a* therein to receive elongated pegs 23 extending inwardly thereof to form stop members.

The structure 10 in the embodiment here described is preferably formed of a suitable rigid plastic material, the various separate portions of which may be secured together by suitable plastic bonding agents except where otherwise indicated.

Disposed between said side portions 26 and 35 and pivotally disposed in pairs of said aligned apertures 27 and 37 are record holding members 40. A preferred embodiment is here shown with the understanding that said holding members may take various specific forms. Only one as representative of all of said holding members shown will be described in detail.

Said member 40 comprises integrally a substantially U-shaped yoke portion 42 having a supporting body portion 43 tapering in thickness having an inclined front wall 45 and a depending leg portion 44 having a somewhat rearwardly bulging tip portion 46. Said member 40 and the portions described thereof extend the full width between said side members 26 and 35 and said apertures 27 and 37 will be spaced along their respective side wall portions to allow sufficient clearance for freedom of pivotal movement.

Projecting from either end of body portion 43 are aligned pins 47 to be received respectively within aligned pairs of said apertures 27 and 37. Said pins preferably will be located on an axis forwardly of and below the center of gravity or axis of balance of said holding members whereby a major portion of the weight of said holder 40 and of the record 50 therein will accelerate through the downward portion of the tilting action thereof and will apply sufficient leverage against the adjacent holder and record by leg contact therewith to tilt the same upwardly beyond its dead center point or to the point at which it will continue its travel under its own weight.

Upstanding from said bottom wall 14 centrally forwardly and rearwardly respectively thereof are stop members 52 for said holding members 40.

A position marking member or marker 55 is provided comprising a slotted block having an upstanding handle adapted to be disposed onto an end portion of a record 50.

OPERATION

The holding members 40 will be loaded with the records 50. The records are simply set into the slotted yokes 42. If less than all of the holders are used, they will be loaded from the rearmost one forwardly and the stop pins 23 will be suitably positioned to control the forward tilt of the records.

To commence the records in their self-tilting action, the first record will be tilted manually which in turn will automatically tilt the next record, and thus in succession the records will tilt one another.

It is desirable to have a sufficient interval of time in the forward upward tilting movement of each record to enable the operator to identify the record, as by reading the label. The holders are spaced apart sufficiently to provide for the record to swing through a sufficient arc to allow for adequate scanning or reading time. Thus aligned pairs of the apertures 27 and 37 will be spaced sufficiently apart from one another to provide an adequate extent of arcuate movement.

Figure 3:
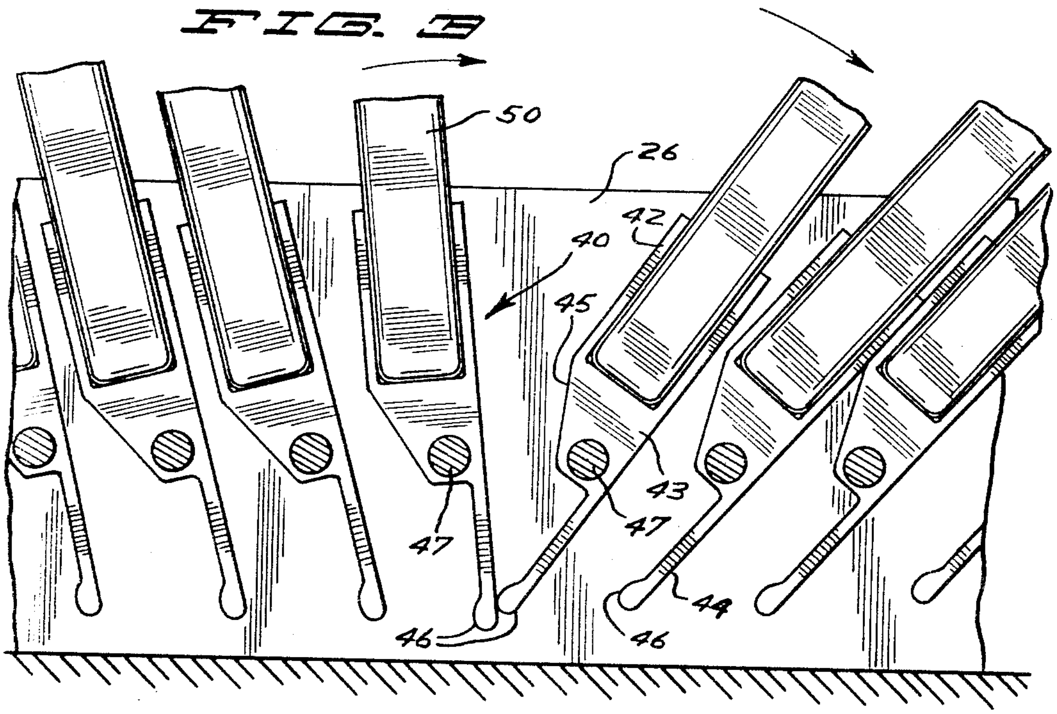
FIG. 3 is a fragmentary view in vertical section on an enlarged scale taken on line 3—3 of FIG. 1 as indicated.

The lengths of the legs 44 will be in relation with the spacing of said aligned pairs of apertures, as shown in FIG. 3. It is on the downward tilt of a record that the leg of its holder will engage the leg of the adjacent holder. There is sufficient leverage and impetus for one holder and its record to engage and move the adjacent holder and record sufficiently to commence self-tilting action. This is accomplished as above described by having the pins 47 aligned on an axis eccentric to the axis at which the holder and its record would be in balance. On the downward tilt, the impetus of unbalanced weight readily tilts the adjacent holder and record. This action is more positive for the tilting of the holders themselves in an unloaded condition or with the items held being of negligible weight than would be the case with the pins being located on an axis of balance of the holders.

It will be understood that the tilting action continues so long as each holder and its record provides sufficient weight to move the succeeding holder and its record upon engagement therewith.

When a record has been removed from a holder, that particular holder upon being tilted will not have sufficient weight to exert sufficient leverage to upset the inertia of the next succeeding holder and record. Hence at such a point the automatic tilting action will stop. Thus the holder from which a record has been removed is readily located.

It will be further understood that the holders in unloaded condition have the same progressive tilting action as in loaded condition.

The term record used herein with respect to a phonograph record is to be understood as being representative of any items capable of being held in an embodiment of a holder within the inventive scope herein.

Thus from the above description, so long as the holders, loaded or unloaded, represent substantially equal amounts of weight, the holders, save for the first one, will cause one another to tilt. Tilting action will stop with the holder having a lesser amount of weight.

MODIFICATION

Figures 4, 5:
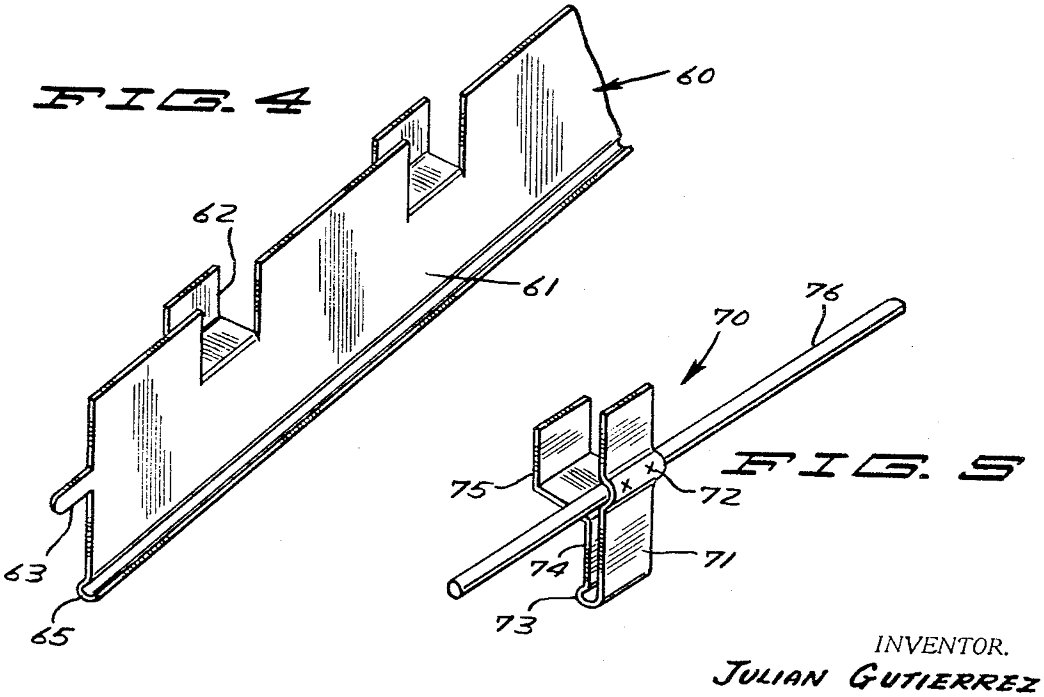
FIG. 4 is a broken view in perspective of a modification of a detail on an enlarged scale.
FIG. 5 is a view similar to FIG. 4 showing a like detail in another modified form.
Figure 6:
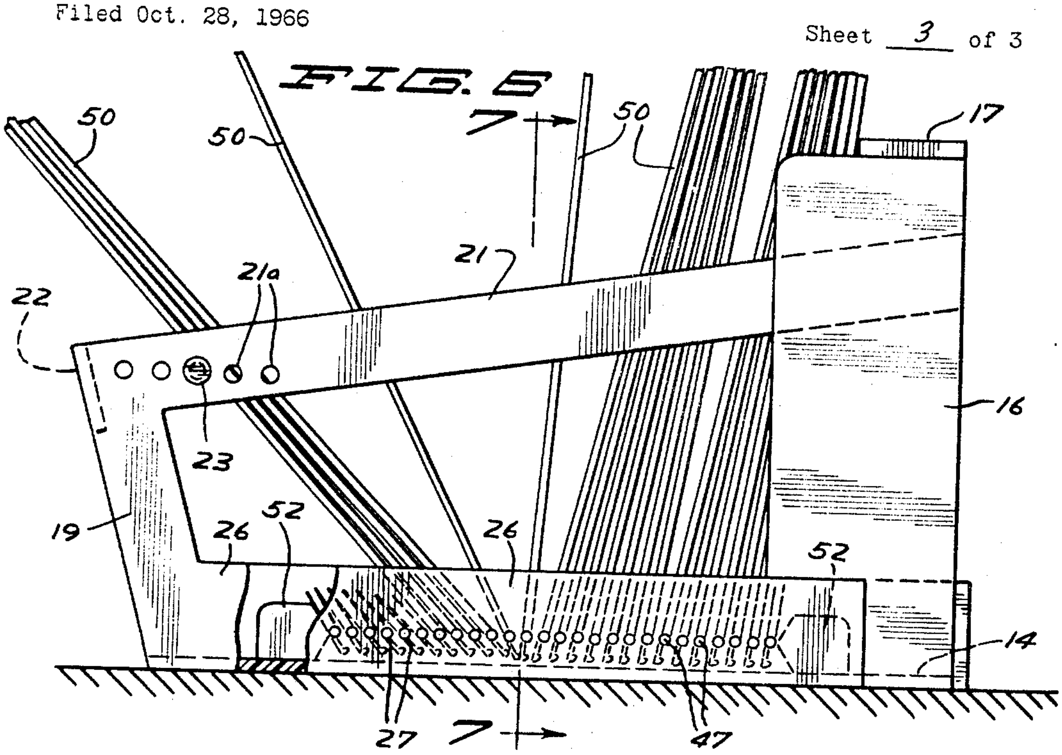
FIG. 6 is a view similar to FIG. 2 showing the opposite side in elevation with some portions in dotted line and a portion broken away.
Figure 7:
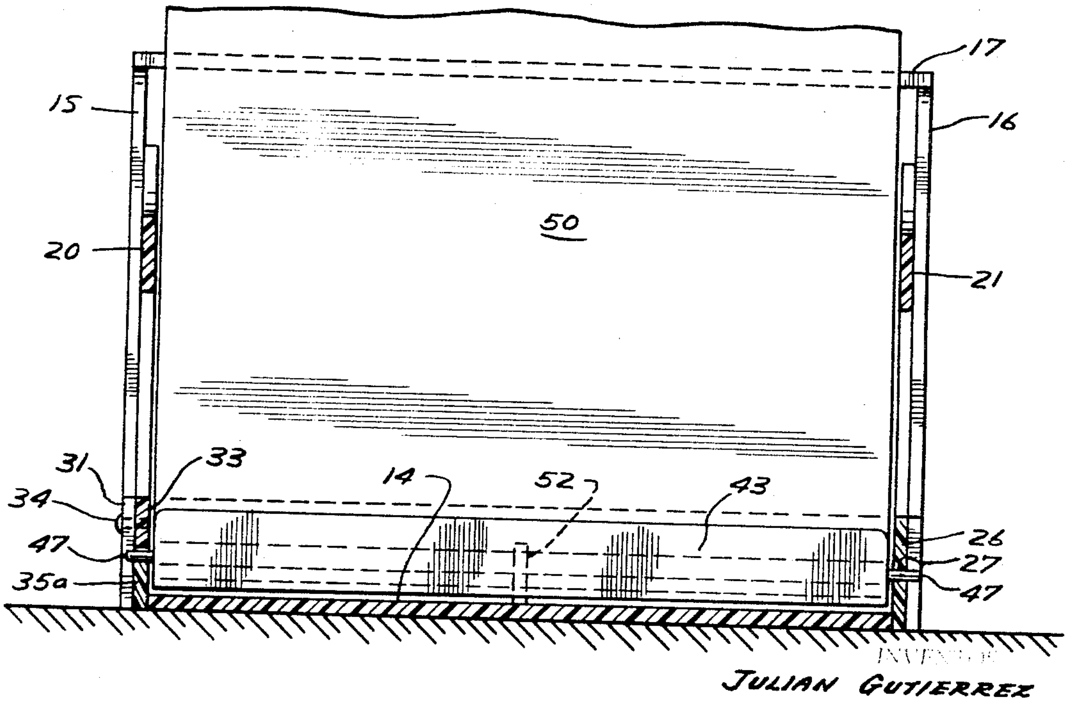
FIG. 7 is a view in vertical cross section with some portions being shown in dotted line and a portion being broken away, taken on line 7—7 of FIG. 6 as indicated.

A broken view of a modified record holder 60 is shown in FIG. 4 comprising a flat elongated plate member 61 having a lower rearwardly beaded edge portion 65, an extended pin or shaft portion 63 at either end thereof on an axis providing for an unbalanced distribution of weight and rearwardly projecting angled brackets 62 struck from said body portion forming the record holding means. With reference to the axis of said pins 63, the greater amount of weight will be upwardly and forwardly of said axis.

Referring to FIG. 5, a record holding member 70 representing another modification is shown comprising a clip of relatively narrow width having a reversely bent body portion having closely adjacent sides 71 and 74 having a rearwardly projecting bead-like juncture 73. The wall 71 extends upwardly with a transverse curved groove therein to receive a rod 76 which will be secured therein as by spot welding. Said rod will extend the full width of said appartaus 10. Said wall 74 has a rearwardly projecting upwardly angled portion 75 forming a yoke or slot with said side 71 to receive a record.

Said holding members 60 and 70 are positioned within the apparatus 10 in the manner described in connection with the holding member 40 to operate in like manner.

Thus it is seen that I have provided a simply constructed self-actuating record holding apparatus which has been very successful in operation.

It will of course be understood that various changes may be made in the form, details, arrangement and proportions of the parts, without departing from the scope of applicant's invention which, generally stated, consists in an apparatus capable of carrying out the objects above set forth, in the parts and combinations of parts disclosed and defined in the appended claim.

What is claimed is:

1. A self-actuating record holding apparatus having in combination:

a pair of frame members, means supporting said frame members in parallel spaced relation, said frame members having aligned pairs of holding means spaced longitudinally thereof, a holding member as for a record comprising a U-shaped member of substantially shorter height than the record held therein having an underlying body portion of reduced thickness, a leg portion depending from said body portion, means at either side of said body portion pivotally engaging an aligned pair of said holding means, said means being arranged to provide a pivotal axis through said body portion eccentric to said holding member, one of said holding members being disposed between each of said pairs of holding means, said holding means being spaced to have the body portions of adjacent said holding members free of contact with one another in tilting from an inclined rest position in one direction to an inclined rest position in the opposed direction, said leg portions of said holding members each being of such a length as to have its respective body portion tilt through an arc beyond its center of specific gravity prior to its engagement with the leg portion of the adjacent holding member to tilt said adjacent holding member and disengaging from said adjacent leg portion as said adjacent body portion tilts beyond its point of specific gravity whereby upon the first of said holding members being tilted manually, the remainder of said holding members automatically successively tilt one another.

References Cited

UNITED STATES PATENTS

| | | | |
|---|---|---|---|
| 815,785 | 3/1906 | Bennett | 129—16 XR |
| 1,440,491 | 1/1923 | Proudfit | 211—11 |
| 1,469,798 | 10/1923 | Martin. | |
| 1,474,642 | 11/1923 | Proudfit. | |
| 1,692,231 | 11/1928 | Thompson. | |
| 2,226,519 | 12/1940 | Larsen. | |
| 2,843,131 | 7/1958 | Wolters | 129—160 |

FOREIGN PATENTS

| | | |
|---|---|---|
| 213,845 | 3/1958 | Australia. |
| 91,406 | 7/1958 | Denmark. |
| 725,993 | 2/1932 | France. |
| 649,720 | 9/1937 | Germany. |
| 81,789 | 6/1956 | Netherlands. |
| 114,118 | 6/1945 | Sweden. |

CHANCELLOR E. HARRIS, *Primary Examiner.*

ABRAHAM FRANKEL, *Assistant Examiner.*

U.S. Cl. X.R.

129—16; 211—169